United States Patent [19]

Chen

[11] Patent Number: 5,138,853
[45] Date of Patent: Aug. 18, 1992

[54] ANTITHEFT LOCK FOR A VEHICLE

[76] Inventor: Ruei-Mei Chen, 18, Lane 76, Sec. 2, Hsing Sheng N. Rd., Taipei City, Taiwan

[21] Appl. No.: 765,023

[22] Filed: Sep. 24, 1991

[51] Int. Cl.⁵ .............................................. B60R 25/02
[52] U.S. Cl. .................................. 70/209; 70/226; 70/238
[58] Field of Search ........................ 70/209-212, 70/235, 226, 238, 239, 252, 215

[56] References Cited

U.S. PATENT DOCUMENTS

| | | | |
|---|---|---|---|
| 4,103,524 | 8/1978 | Mitchell et al. | 70/209 |
| 4,708,005 | 11/1987 | Bernacchi | 70/238 |
| 4,730,470 | 3/1988 | Zane et al. | 70/238 |
| 4,747,279 | 5/1988 | Solow | 70/238 |
| 4,848,110 | 7/1989 | Kuo | 70/238 X |
| 4,882,920 | 11/1989 | Wu | 70/209 |
| 4,935,047 | 6/1990 | Wu | 70/238 X |
| 4,959,981 | 10/1990 | Davidson | 70/238 |
| 5,005,388 | 4/1991 | Lo | 70/226 X |
| 5,042,278 | 8/1991 | Wang | 70/226 X |
| 5,055,823 | 10/1991 | Fuller | 70/226 X |

FOREIGN PATENT DOCUMENTS

| | | | |
|---|---|---|---|
| 631708 | 6/1936 | Fed. Rep. of Germany | 70/209 |
| 2639591 | 6/1990 | France | 70/226 |

Primary Examiner—Renee S. Luebke
Assistant Examiner—Suzanne L. Dino
Attorney, Agent, or Firm—Bacon & Thomas

[57] ABSTRACT

An antitheft steering wheel lock for securing to a steering wheel from the inside thereof, and including a rod member surrounded with a sleeve, two groove ends extending beyond the sleeve and two hooks secured to two ends of the sleeve, respectively, and forming two openings in an opposed direction. A U-shaped member and a fork-shaped member are provided to sleeve onto the two groove ends and the two hooks, respectively, for securing the open ends of the rod and prevent removal of the lock, thus guarding the vehicle.

3 Claims, 6 Drawing Sheets

ANTITHEFT LOCK FOR A VEHICLE

FIELD OF THE INVENTION

This invention relates to a steering wheel lock. More particularly, a lock has no open end disposed thereof when in a locked position.

BACKGROUND OF INVENTION

Locks have played a major role in protecting our safety as well as properties for a long time. They are still important to us no matter what place or city we live in. It is the reason that many kind of locks are being designed and produced.

Steering wheel locks for a vehicle are of interest for inventors and factories. Therefore, many steering wheel locks have been developed. Although inventors are trying to improve upon steering wheel locks to get the best antitheft results, they still include defects which are required to be solved. For instance, an automobile steering lock patented in the U.S. Pat. No. 4,738,127, as shown in FIG. 4, comprises a rod 1' having a number of grooves 11' extending along the rod body axially and the rod 1' is slidable freely in telescopic fashion within a tubular member 2'. The tubular member 2' has an extended portion 21' at one end which when said lock is secured on a steering wheel, extends outward beyond the periphery of the steering wheel and comes into contact with the vehicle interior or the driver when the wheel is turned and thereby blocks complete rotation of the steering wheel. Such lock has two open hook ends 22' in an opposed direction and either one of which when pried by force, as shown by the phantom line in FIG. 5, or hit by force from the handle end, as shown in FIG. 6 will lose its antitheft function.

The inventor has invented a lock which has no open end upon being secured on a steering wheel.

SUMMARY OF THE INVENTION

It is the primary object of the present invention to provide an antitheft lock for a vehicle which engages the rim of a steering wheel.

It is another object of the present invention to provide an antitheft lock for a vehicle which requires little space in storage.

It is still another object of the present invention to provide an antitheft lock for a vehicle which is easy to operate.

It is a further object of the present invention to provide an antitheft lock for a vehicle which is inexpensive to mass produce.

DETAILED DESCRIPTION OF THE PREFERRED EMBODIMENT

Figure 1:
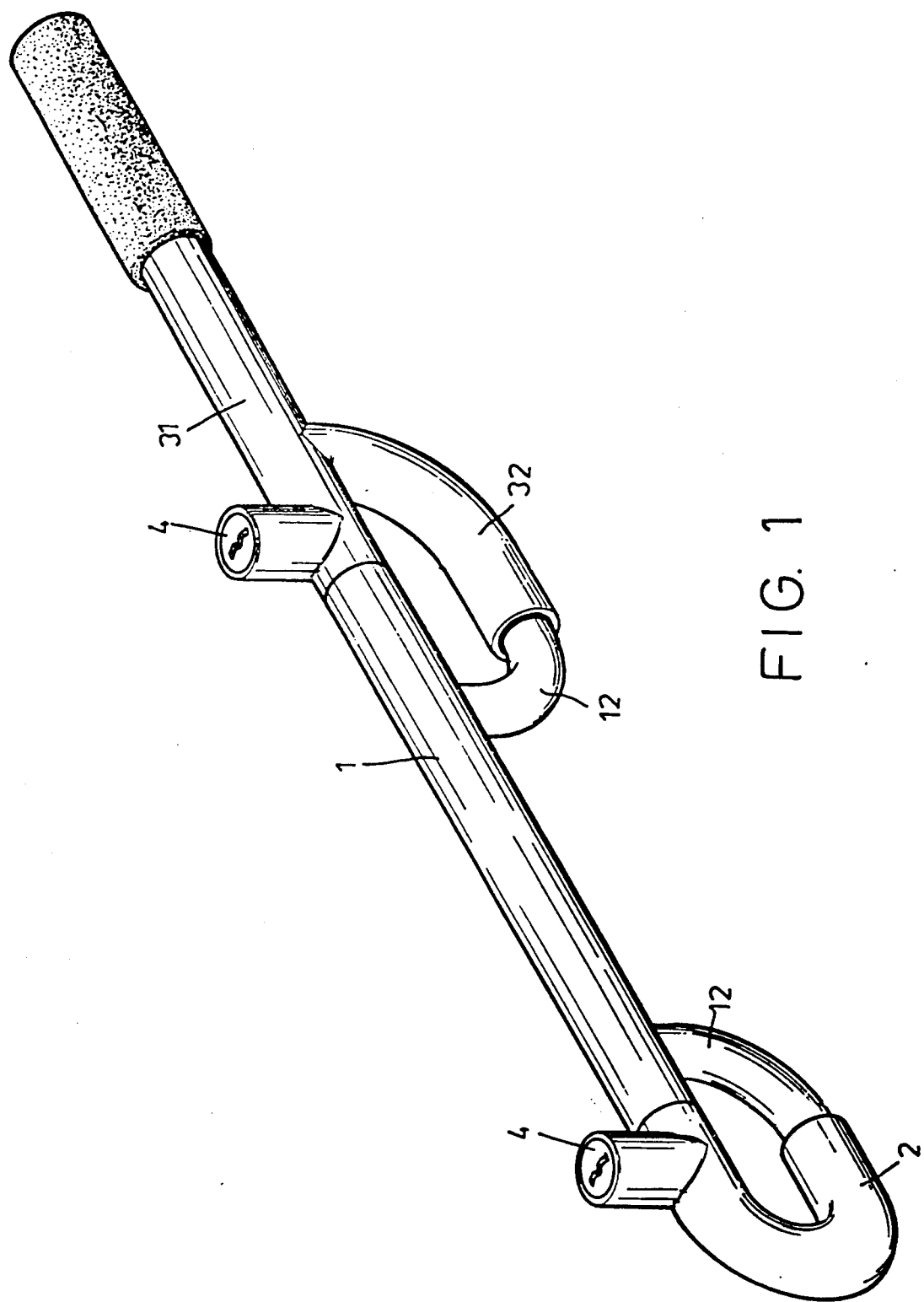
FIG. 1 is a perspective view of the present invention.
Figure 2:
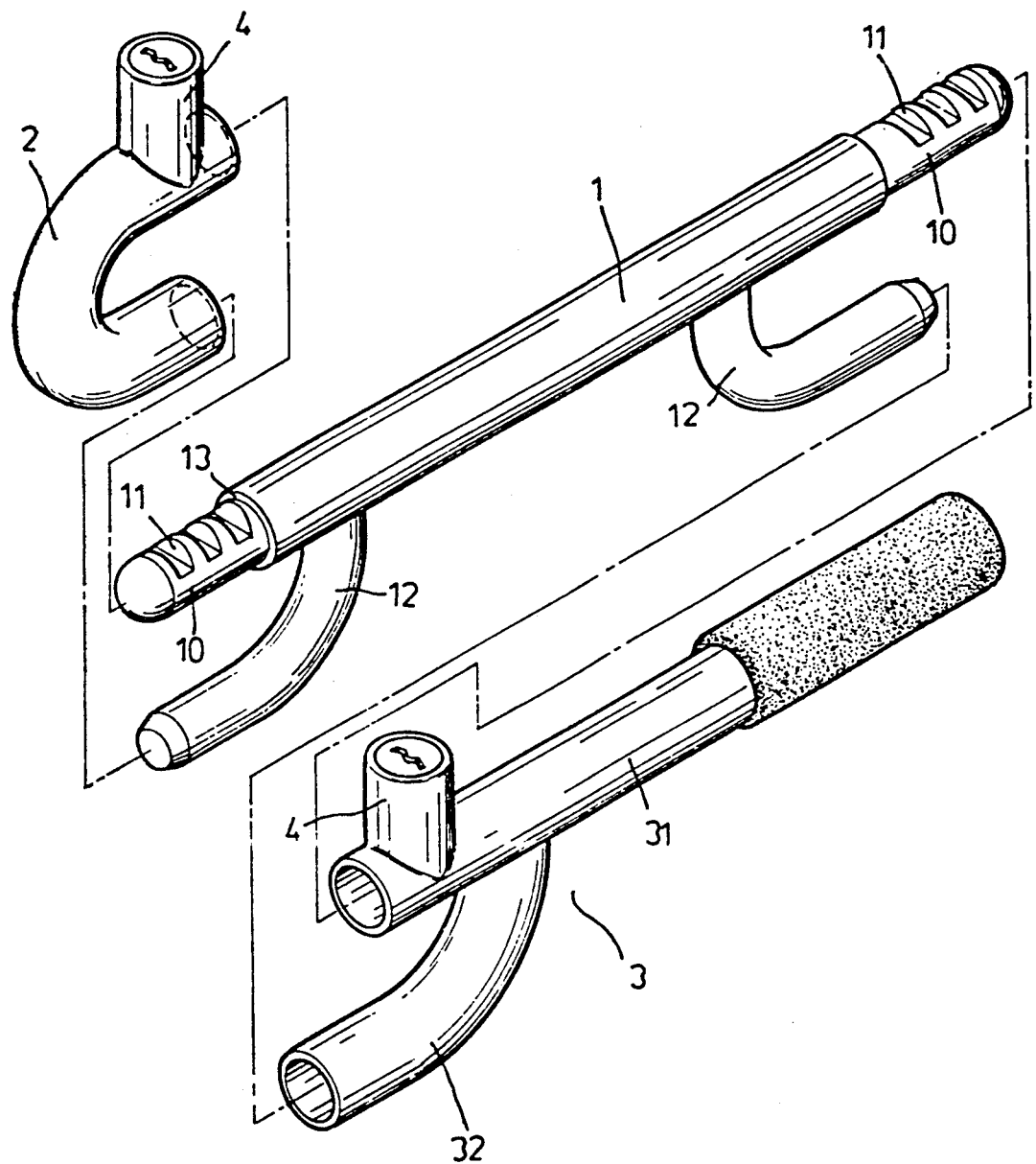
FIG. 2 is a fragmentary view of the present invention.

Referring to the drawings wherein the showing are for the purpose of illustrating a preferred embodiment of the invention only and not for the purpose of limiting the same, FIGS. 1 and 2 show the present invention as comprising a rod member 1 having grooves 11 equally and axially spaced along two ends, two hooks 12 secured to two ends, and a sleeve 13, preferably made of PVC, surrounded on the outer portion of the rod 1 with the exception of the two ends 10 and the two hooks 12 which are rigidly secured to the rod 1 at the sleeve 13. The lock or the present invention is composed of a U-shaped member 2, a fork-shaped member 3 and a locking means. Two hooks 12 are so arranged that when the first hook 12 is positioned to engage a portion of a steering wheel from the inside thereof, and is pushed all the way until the innermost portion of the hook 12 is engaged with and is stopped by the rim of the steering wheel, the second hook 12, at this time, is able to be engaged with a portion of the steering wheel from the inner side in an opposed direction to the first hook 12.

The U-shaped member 2, being made of but not limited to stainless steel, has a hollow body and a boss extending upwardly from one end to accept a locking means 4. The diameter of the U-shaped member 2 is the same as of the PVC 13 whereas, the inner diameter of the member 2 is the same as the two ends 10 of the rod member 1 and the hooks 12 not surrounded with PVC sleeve.

The fork-shaped member 3, being made of but not limited to stainless steel, has a partially hollow body and a boss extending upwardly from one end to accept a locking means 4, a projecting portion 31 at the other end which projects from the periphery of the steering wheel when secured thereto in such a length that will contact either the body of the driver or the interior when rotating the wheel and a hook 32 being rigidly secured to the projecting portion and forming an opening facing outward thereof.

Figure 3:
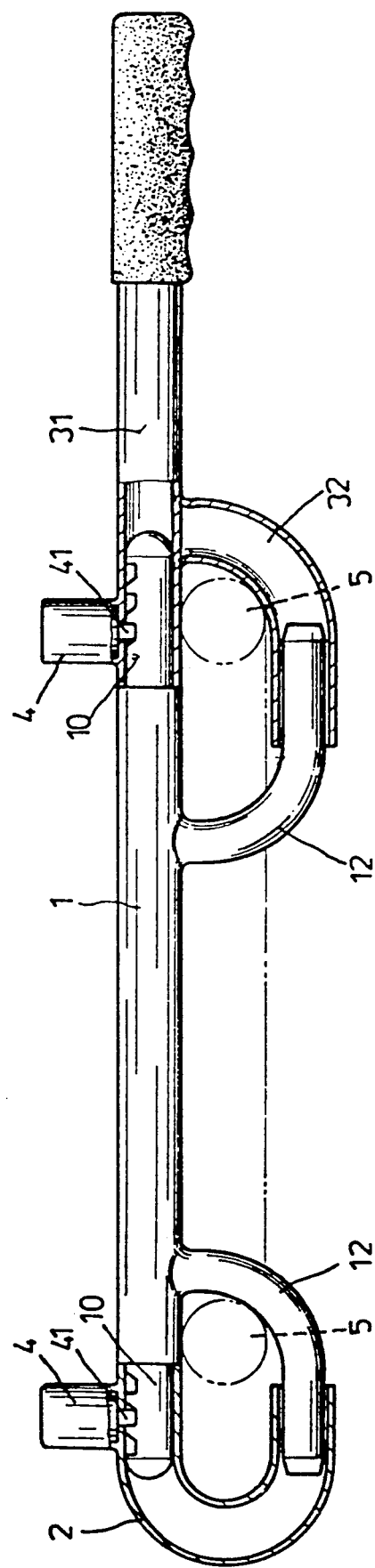
FIG. 3 is a cross sectional view of FIG. 1 showing a locked position.
Figure 4:
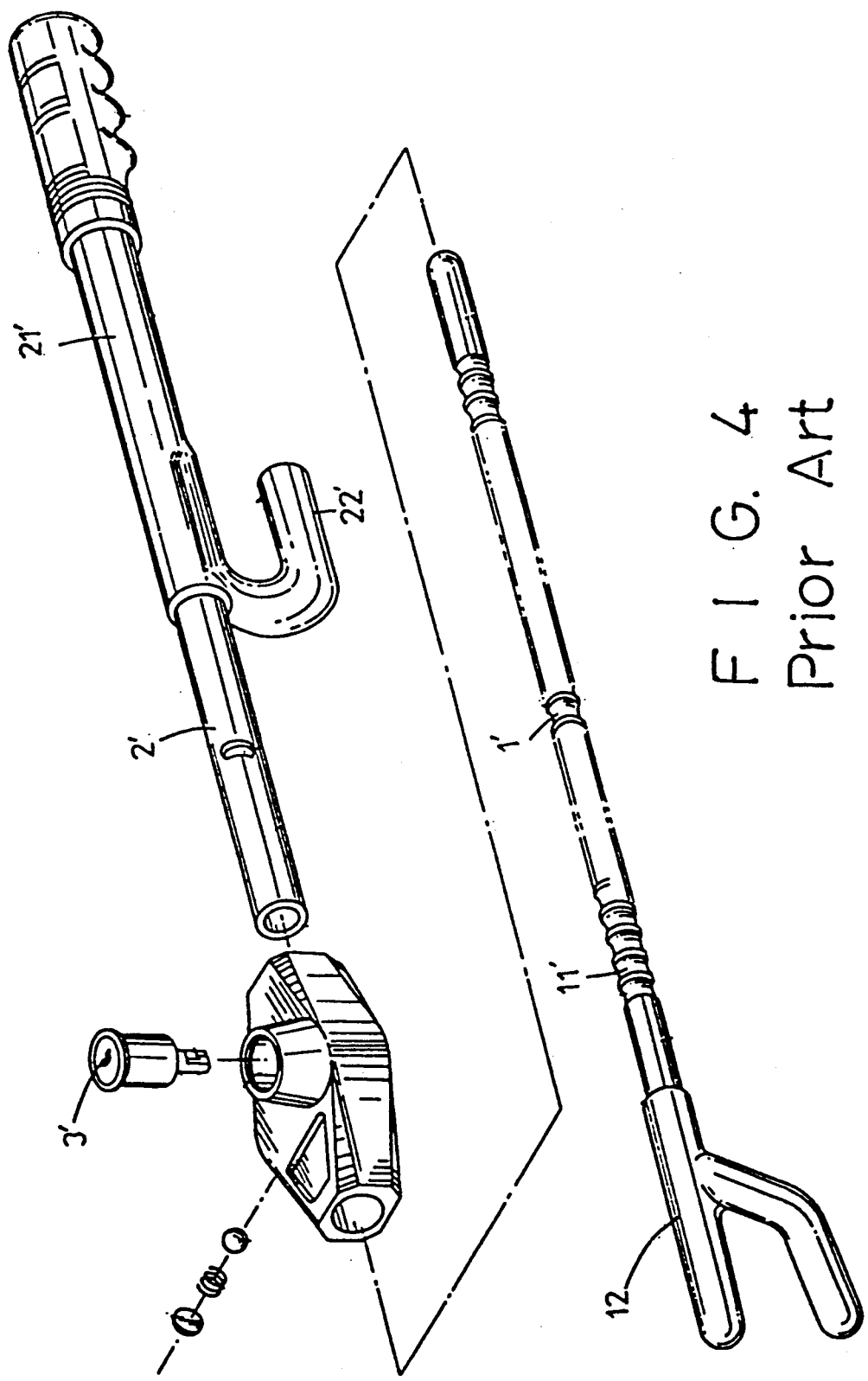
FIG. 4 is a fragmentary view of prior art.
Figure 5:
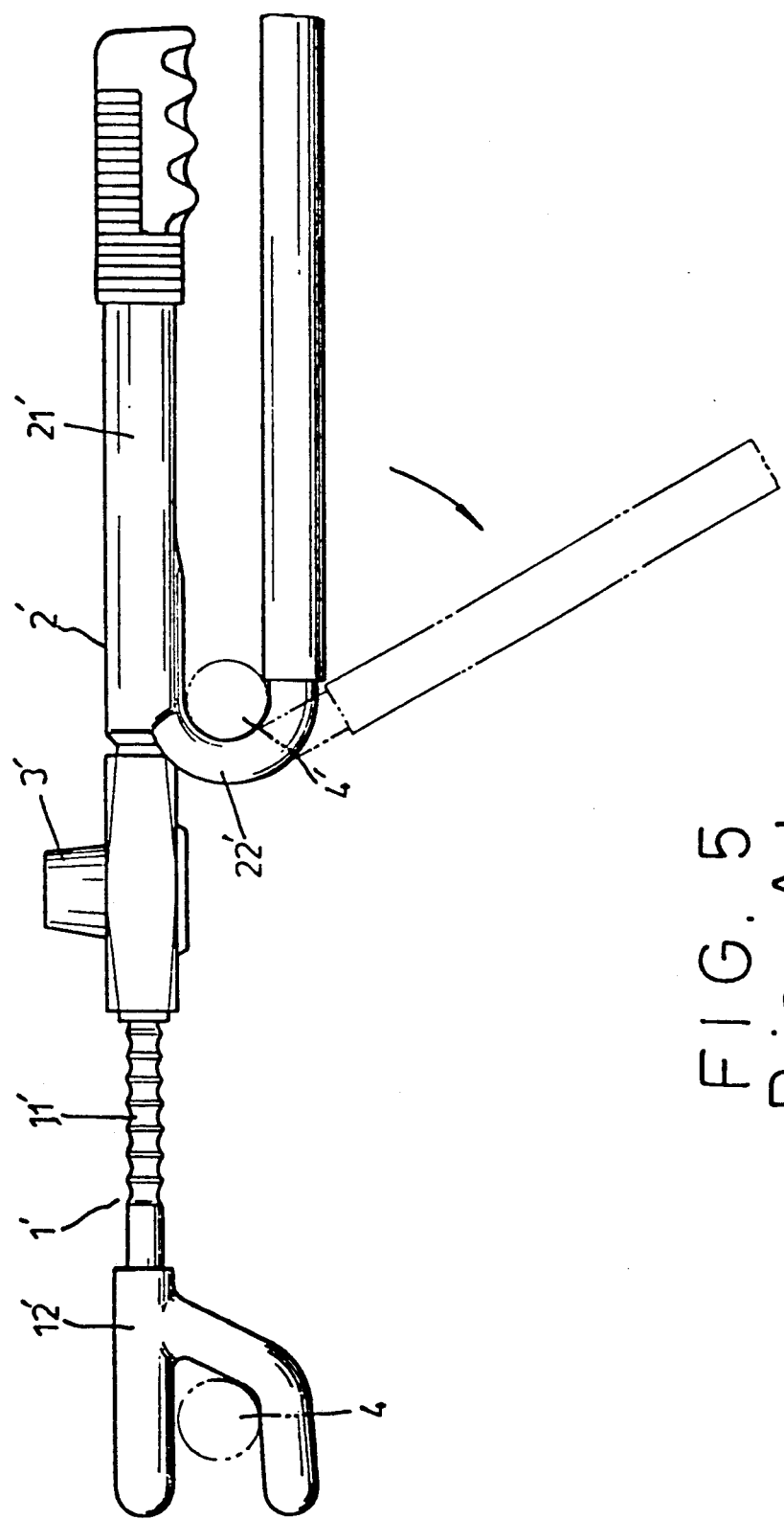
FIG. 5 is a side view of FIG. 4 showing an open end pried by force and bent downwardly.
Figure 6:
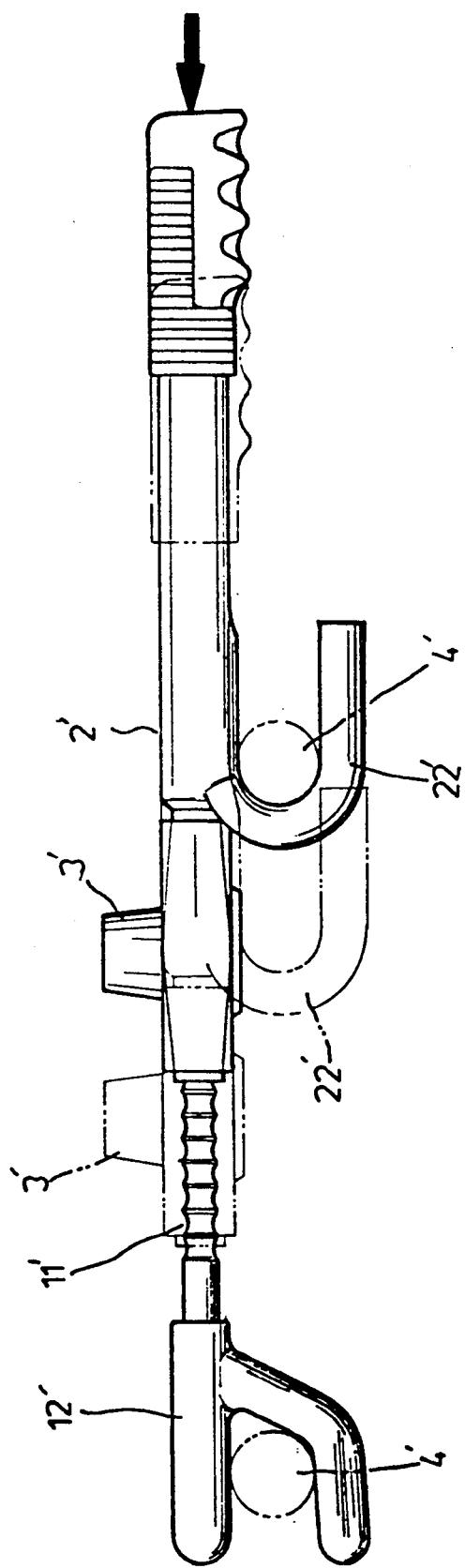
FIG. 6 is another side view of FIG. 4 showing the handle end being hit by force and moved inwardly.

In operation, when the two ends 10 and the two hooks 12 of the rod member 1 are engaged with the rims 5 of the steering wheel from the inside thereof in an opposed direction, the U-shaped member 2 and the fork-shaped member 3 are sleeved onto the two ends 11 and the two hook ends 12, respectively, with the lock cores 41 of the locking means 4 to engage with the groove ends 11. Thus both of the groove ends 11 and the hook ends 12 are encompassed by the U-shaped member 2 and the fork-shaped member 3, respectively, as shown in FIG. 3. The locking means 4 are well known in the art and will not be described detail herein.

To unlock the present invention, simply use a valid key to unlock the lock means 4 and pull the U-shaped member 2 and the fork-shaped member 3 outward, and the rod member 1 is able to be disengaged from the steering wheel.

I claim:
1. An antitheft lock for a vehicle comprising:
   a) a rod member including first and second ends, a plurality of grooves extending axially along the first and second ends, and an outwardly facing hook secured to each of the first and second ends;
   b) a U-shaped member including a hollow body and a boss extending upwardly therefrom for receiving a locking means, the U-shaped member being detachably engageable onto the first end and its corresponding hook; and
   c) a forked-shaped member including a hollow body, first and second portions, a boss extending upwardly from the first portion for receiving a lock- ing means and a projection extending from the second portion, the fork-shaped member being detachably engageable onto the second end and its corresponding hook.

2. The antitheft lock of claim 1 further including a sleeve surrounding the rod member.

3. The antitheft lock of claim 1 wherein the hollow bodies of the U-shaped and fork-shaped members each have inner diameters which are substantially the same as the outer diameters of their corresponding ends and hooks for receiving same therein.

* * * * *